US006760280B1

(12) United States Patent
Schoppe

(10) Patent No.: US 6,760,280 B1
(45) Date of Patent: Jul. 6, 2004

(54) OPTICAL MEMORY CARD IN THE FORM OF A DISK

(76) Inventor: Karl-Heinz Schoppe, Kirchrather Strasse 35, 52074 Aachen (DE)

( * ) Notice: Subject to any disclaimer, the term of this patent is extended or adjusted under 35 U.S.C. 154(b) by 180 days.

(21) Appl. No.: 10/031,202
(22) PCT Filed: Jul. 5, 2000
(86) PCT No.: PCT/DE00/02135
§ 371 (c)(1), (2), (4) Date: Jan. 9, 2002
(87) PCT Pub. No.: WO01/04905
PCT Pub. Date: Jan. 18, 2001

(30) Foreign Application Priority Data

Jul. 10, 1999 (DE) .......................................... 199 32 340
Sep. 29, 1999 (DE) ..................................... 299 17 105 U

(51) Int. Cl.[7] ............................................. G11B 13/00
(52) U.S. Cl. .......................................... 369/14; 235/454
(58) Field of Search ............................. 369/14, 275.7, 369/275.2, 272, 273, 280, 281, 287, 288, 289, 292; 235/380, 454, 475, 486, 487, 488

(56) References Cited

U.S. PATENT DOCUMENTS

| 4,812,633 | A | * | 3/1989 | Vogelgesang et al. ...... 235/487 |
| 4,868,373 | A | * | 9/1989 | Opheij et al. ............... 235/380 |
| 4,916,687 | A | * | 4/1990 | Endo .......................... 369/111 |
| 5,149,951 | A | * | 9/1992 | Vogelgesang ............... 235/485 |
| 5,307,338 | A | * | 4/1994 | Suzuki et al. ............... 369/191 |
| 5,869,163 | A | * | 2/1999 | Smith et al. ............... 428/64.1 |
| 5,982,736 | A | * | 11/1999 | Pierson ........................ 369/273 |
| 6,016,298 | A | * | 1/2000 | Fischer ....................... 369/75.1 |
| 6,400,675 | B1 | * | 6/2002 | Everidge et al. ............ 369/273 |
| 6,510,124 | B1 | * | 1/2003 | Wood .......................... 369/273 |
| 6,535,465 | B1 | * | 3/2003 | Shigetomi et al. ............ 369/14 |
| 6,542,444 | B1 | * | 4/2003 | Rutsche ........................ 369/14 |
| 6,616,052 | B2 | * | 9/2003 | Tseng et al. ................ 235/487 |

FOREIGN PATENT DOCUMENTS

| DE | 296 16 619 | 1/1997 |
| DE | 297 04 140 | 7/1997 |

* cited by examiner

Primary Examiner—Tan Dinh
(74) Attorney, Agent, or Firm—Gudrun E. Huckett

(57) ABSTRACT

An optical data carrier has a memory member having a radiation-transparent layer and an information recording layer adjoining it. The information recording layer has a surface with memory areas for digital information. The data carrier has a through opening for receiving a read/write device and has a thickness equal to that of a chip card or magnetic strip card. The memory member is 0.5–0.6 mm thick. An adapter for the read/write device has a base member with a rectangular recess of inner dimensions slightly greater than the outer dimensions of the plate-shaped data carrier to be received therein. The base member has a central opening coaxial to the through opening of the data carrier. The adapter/data carrier unit can rotate without balance error about a central axis of through opening and central opening. The combined thickness of the data carrier and of the base member measured at the recess corresponds to that of a standard DVD data carrier.

20 Claims, 2 Drawing Sheets

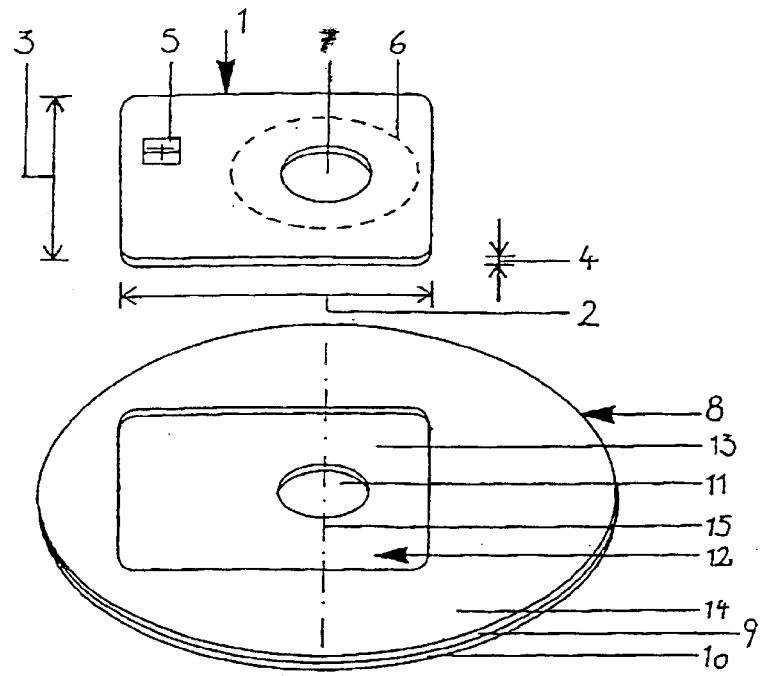
FIG. 1
FIG. 2
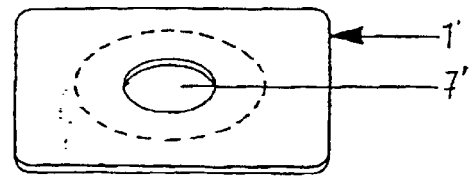
FIG. 3
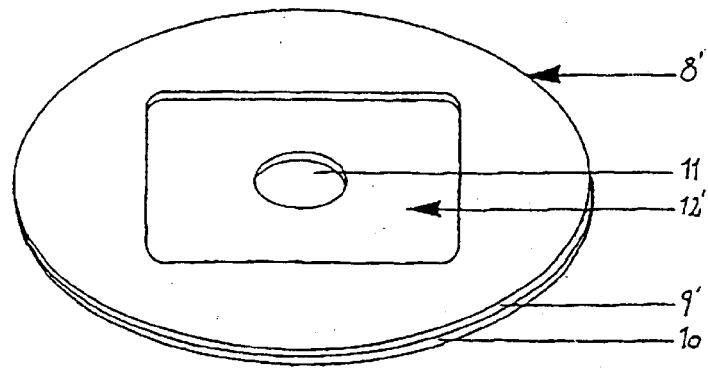
FIG. 4

OPTICAL MEMORY CARD IN THE FORM OF A DISK

BACKGROUND OF THE INVENTION

1. Field of the Invention

The present invention relates to a plate-shaped optical data carrier comprising a layer transparent for radiation and an information recording layer on the surface of which memory areas for digital information are arranged, wherein said data carrier comprises a through opening for a receiving means of a reading and/or writing device.

2. Description of Related Art

Such data carriers are generally known by the names of CD (Compact Disc), CD ROM (Compact Disc Read Only Memory), and DVD (Digital Versatile Disc). Apart from solely readable types there are also types such as CD-R which allow the user to individually record information by using specific writing devices, possibly even as a rewriteable type (CD-RW).

The known data carriers are received at their central opening by an appropriate reading and/or writing device and rotated so as to realize a data flow from and to the data carrier by means of a radially movable reading and/or writing head emitting a laser beam.

The generally known prior art also includes so-called CD ROM cards having the thickness of a conventional CD ROM or DVD but mostly not having the standardized check card format. On such data carriers, the memory area is limited to a circular ring of the maximum possible diameter fitting into the roughly rectangular surface of the data carrier. Compared with conventional check cards comprising a magnetic strip or electronic chip elements, these CD ROM cards are remarkably thicker which is regarded as a disadvantage. This thickness significantly reduces their elasticity, which, if the CD ROM card is carried in a purse, adversely affects the carrying comfort of the latter. Also the free space in conventional wallets or purses often does not allow to receive a plurality of CD ROM cards. Also, the polycarbonate used to manufacture these CD ROM cards is disadvantageous for handling the card in typical rough everyday conditions as the brittleness of the material, in combination with its low elasticity, may easily cause the material to break or crack. DE 29616 619 U1 describes a so-called multimedia business card whose width and length are similar to the size of standard paper business cards. However, this known business card is made of CD ROM material with the thickness of the business card being equal to that of a normal CD ROM.

Such a so-called non-standard format of a CD or CD ROM cannot be used in all conventional players. DE 297 04 140 U1 thus discloses a CD player adapter, especially for the multimedia business card described in DE 296 16 619 U1. The outer dimensions of the body of the CD player adapter equal exactly the dimensions of a standard CD or CD ROM while said body comprises an inner through recess of a rectangular cross-section corresponding to the shape of the peripheral geometry of the multimedia business card. The business card can be fixed on the player adapter because its front sides have a convex shape while the front edges of the inner recess of the player adapter are of a matching concave shape. Due to the elasticity of the plastic material used to form the business card as well as the player adapter, the business card can be inserted into the recess using a certain force, thus ensuring a secure and defined connection of the two components due to the matching shapes in the inserted state. In order to facilitate the action of inserting or extracting the business card into or from the player adapter, widened rounded areas are provided in the corner areas of the inner recess.

Further, it is desirable to increase the variability of such data carriers with regard to various storage principles and the corresponding reading and writing methods.

SUMMARY OF THE INVENTION

It is an object of the present invention to provide a data carrier whose handling and keeping meet high comfort requirements and which is characterized by variability as regards the storage principles applied in data storage.

Based on a data carrier of the type described above, this object is achieved according to the present invention in that the thickness of the data carrier is smaller than the thickness of a standart data carrier of the DVD type but larger than the sum of the thickness of the information recording layer of a standard data carrier of the DVD type and of the minimum backing layer thickness required.

Due to its reduced thickness, such a data carrier offers good flexibility and therefore very comfortable handling. To carry even a plurality of such data carriers does not cause the space problems occurring with regard to conventional CD ROM cards. The thickness of the backing layer needs to be dimensioned only so small that the data carrier can be handled and transported without the risk of being damaged. As far as the data carrier comprises a layer transparent for radiation above the information recording layer, said transparent layer can completely take on the function of the backing layer ensuring the shape stability of the data carrier, so that the thickness of the layer transparent for radiation essentially defines the minimum thickness of the data carrier as the thickness of the information recording layer is extremely small. It is a fact that the reduction in thickness suggested according to the present invention causes the disadvantage that without further measures the data carrier cannot be read by the CD or DVD players which are presently in use. However, the present invention offers the tremendous advantage of providing an optical data carrier which due to all its dimensions, especially its thickness, is compatible with data carriers using other storage principles (magnetic strip card, chip card, . . . ) and thus can be used in a "multimedia" manner.

Preferably, its thickness, length and width are equal to those of conventional chip cards or magnetic strip cards. According to the present standards, its thickness should be approximately 0.8 mm. Thus, the present invention provides for the first time an optical data carrier which, with respect to its dimensions and usability, is completely compatible with existing formats such as credit card, check card, chip card, and "smart card".

As a particularly advantageous feature of the present invention, the opening is arranged eccentrically and the data carrier is provided with an electronic chip element which is readable and/or writeable via contact surfaces.

In addition to its function as an optical data carrier, the data carrier according to the present invention further has the very advantageous feature of performing the function of a chip card. The space needed for the chip element, whose arrangement is standardized for known chip cards, is provided by eccentrically arranging the opening for the receiving means. When, for example, the center of the opening is arranged on the longer central axis of a rectangle defining the shape of the data carrier, the available storage area is not reduced as the size of the circular ring fitting onto the card remains unchanged compared with a central arrangement of said opening. The eccentric arrangement of the opening increases the safety of application as it is obvious to anybody not to use said card without an adapter. Otherwise, the card (even when having a central opening) cannot be used in slot drives and in the common drawer trays of PCs. However, this weak point also exists with respect to conventional CD cards.

Preferably, the layer transparent for radiation is made of polycarbonate.

In a further development of the present invention, it is provided to arrange the chip element on the side of the data carrier positioned opposite to the layer transparent for radiation.

In order to further enhance the functionality and compatibility of the data carrier with respect to different storage principles, it is suggested to provide the data carrier with a magnetic strip. It makes sense to arrange the magnetic strip as well as the chip element on the side of the data carrier positioned opposite to the layer transparent for radiation. In such case, it will really be a multimedia data carrier.

In order to meet higher aesthetic requirements of the data carrier and/or to provide the data carrier with specific security features, a further development of the present invention suggests to provide the side of the data carrier positioned opposite to the layer transparent for radiation with a coating, for example, in the form of a "watermark" or a hologram.

In a further development, the data carrier according to the present invention comprises a circular-ring memory member comprising the opening, a supporting member having the thickness, length, and width of a standard data carrier of the chip card type, and a chip element being readable and/or writeable via contact surfaces, wherein the memory member and the chip element are insertable into the support member in a manner providing essentially plane surfaces of the data carrier.

On the one hand, an annular memory member is easier to manufacture than a memory member of a different shape, and, on the other hand, different materials can be used for both members in order to meet the different requirements. Thus, the memory member is preferably made of polycarbonate having a high surface hardness while it makes sense to manufacture the supporting member of a flexible material less susceptible to breakage, cracking, or fatigue, for example, a plastic material or cardboard.

Furthermore, it is suggested that the memory member has a thickness between 0.5 mm and 0.6 mm and an outer diameter matching essentially the width of a standard data carrier of the chip card type in order to achieve the largest memory capacity possible of the data carrier.

In a preferred embodiment of the data carrier, the supporting member is at least in part made of hard cardboard. This offers the advantage that the user may individually print on the supporting member by laser printing, for example, for use as a business card. After printing, the memory member and, if applicable, the chip element may be inserted into the properly shaped respective recesses of the supporting member and be affixed, for instance, by gluing. Compared with conventional business cards, such business cards offer the advantage that, on the one hand, considerably more information can be stored while maintaining the flexibility of common chip cards, and, on the other hand, this information can be directly read into the data processing system of the recipient of the business card, thus making separate and time-consuming manual input of these data redundant.

Further, the present invention suggests an adapter to receive a data carrier, said adapter being provided with a receiving space whose inner dimensions are slightly larger than the outer dimensions of the data carrier to be received, and with a central opening arranged coaxially to the opening in the data carrier in its received position, wherein the sum of the thickness of the data carrier and the thickness of the adapter in the receiving space area is equal to the thickness of a standard data carrier of the DVD type and wherein the unit formed of the adapter and the data carrier is rotatable without balance error around the central axis of the opening.

This ensures in a simple manner the playability of the data carrier according to the present invention even at high revolution rates and independently from the model of the reading and/or writing device. Usually the user does not carry the adapter with him/her; the adapter is kept with the reading and/or writing device. One single adapter is sufficient for a plurality of similar data carriers. The adapter can, for example, be integrally formed by injection molding or assembled from two disks.

BRIEF DESCRIPTION OF THE DRAWINGS

Now the present invention will be further described with respect to two embodiments of data carriers being schematically shown in the figures, in which:

FIG. 1 shows a data carrier having an eccentrically arranged opening and a chip element as well as a magnet strip;

FIG. 2 shows an adapter for receiving the data carrier shown in FIG. 1;

FIG. 3 shows a data carrier with a centrally arranged opening;

FIG. 4 shows an adapter for receiving the data carrier shown in FIG. 3;

Figure 5:
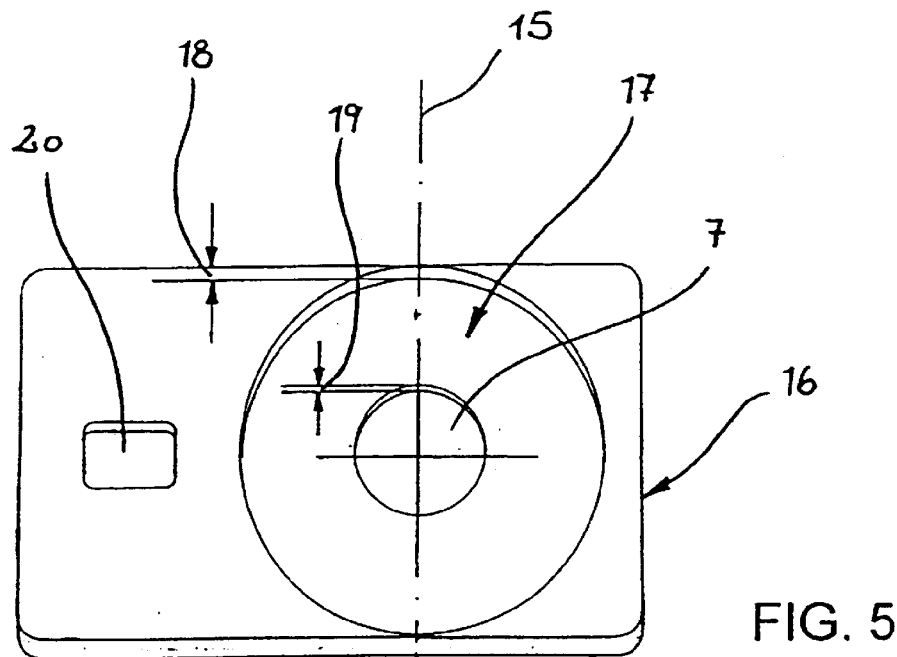
FIG. 5 shows a supporting member.

A data carrier 1 shown in FIG. 1 has approximately the rectangular format of a standard chip card, i.e., a length 2 of approx. 85 mm, a width 3 of approx. 54 mm, and a thickness 4 of approx. 0.8 mm. The data carrier 1 is provided in an area standardized for this purpose with an electronic chip element 5 for reading and writing digital information.

The data carrier 1 further comprises on its side not visible in FIG. 1 a layer transparent for radiation having a thickness of approx. 0.5 mm and an information recording layer, arranged below the layer in a view from the bottom surface of the data carrier, with memory areas for digital information being arranged on the surface of the information recording layer. The information recording layer extends over a circular ring area defined by the dashed line 6.

Further, the data carrier 1 comprises an opening 7 being eccentrically arranged with respect to the rectangle, i.e. away from its center of gravity, the opening cooperating with a receiving means (not shown) of a reading and/or writing device and thus being standardized in its dimensions and shape. Due to the eccentric opening the risk of playing the data carrier 1 without the corresponding adapter is reduced.

FIG. 2 shows an adapter 8 having the basic shape of a conventional data carrier of the DVD type and a thickness of 1.2 mm. The adapter 8 is assembled from two cylindrically shaped circular disks 9 and 10, the upper one having a thickness of approx. 0.8 mm and the lower one having a thickness of approx. 0.4 mm. The two circular disks 9 and 10 are glued to each other with their mutual contact surfaces.

The lower circular disk 10 of FIG. 2 comprises a central through opening 11 having the same diameter as the opening 7 in the data carrier 1. The upper circular disk 9 is provided with a rectangular cutout which defines a receiving space 12 together with the end face 13 of the lower circular disk 10 forming a terminating plane. The data carrier 1 according to FIG. 1 can be inserted in the receiving space 12 in such a way that, on the one hand, the opening 7 in the data carrier 1 is in alignment with the opening 11 in the adapter 8, and, on the other hand, the surface formed by the transparent layer of the data carder 1 is flush with the end face 14 of the upper circular disk 9. Thus, a unit comprising the data carrier 1 and the adapter 8 is provided which is rotatable at a high speed without balance error around the central axis 15 of the openings 7 and 11 of the assembled data carrier 1 and the adapter 8. Therefore, the data carrier 1 can be used in commercially available reading and/or writing devices.

FIG. 3 shows an alternative data carrier 1' having, similar to the data carrier 1 shown in FIG. 1, length, width, and thickness dimensions equal to those of a conventional chip card or magnetic strip card. In order to ensure the playability of the data carrier 1' irrespective of the constructional design of the receiving means of the reading and/or writing devices, an adapter 8' shown in FIG. 4 is used which like the adapter 8 according to FIG. 2 comprises two circular disks 9' and 10 being glued to one another. While the lower circular disk 10 is identical to that of the adapter 8 and comprises a central opening 11', the upper circular disk 9' comprises a centrally arranged rectangular recess. Thus, a receiving space 12' is defined which allows the insertion of the data carrier 1' in such a way that its opening 7' is in alignment with the opening 11 and that it can be inserted into conventional reading and/or writing devices.

Figure 6:
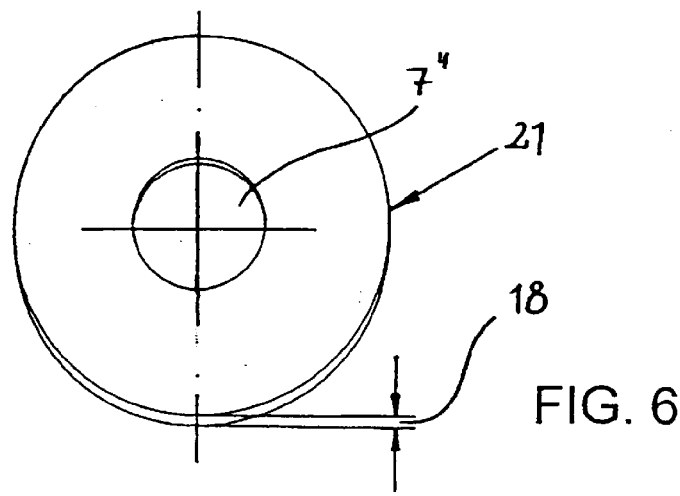
FIG. 6 shows a memory member.
Figure 7:
FIG. 7 shows a chip element.

The design of the data carrier 1 shown in FIG. 1 is clearly illustrated by FIGS. 5 through 7. The data carrier comprises a supporting member 16 made of hard cardboard which corresponds in its length, width, and thickness to the respective dimensions of the data carrier 1. The support member 16 comprises a cylindrical recess 17 whose central axis 15 is located on the plane of symmetry extending in lengthwise direction of the support member 16 while being arranged offset relative to the plane of symmetry extending transversely thereto, i.e., perpendicularly thereto. The recess 17 has a depth 18 of approx. 0.58 mm, which results in a remaining thickness 19 of the support member 16 in the area of the recess 17 amounting to approx. 0.22 mm. The through opening 7 is arranged coaxially with the recess 17.

Furthermore, the support member 16 is provided with a generally rectangular through recess 20 into which the chip element 5 according to FIG. 7 can be inserted.

The memory member 21 shown in FIG. 6 has the same outer diameter and the same thickness 18 of 0.58 mm as the recess 17 in the support member 16. The memory member 21 comprises a layer transparent for radiation and an adjacent information recording layer and is made essentially of polycarbonate. The memory member according to FIG. 6 is inserted into the recess of the support member 16 according to FIG. 5 to obtain a data carrier 1 as shown in FIG. 1. Thus, the openings 7" of the memory member 21 and 7 of the support member 16 are congruently arranged one above the other. The surface of the memory member 21 in its glued-in state is flush with the surface of the support member 16.

What is claimed is:

1. A plate-shaped optical data carrier (1, 1') having a substantially rectangular shape, the plate-shaped optical data carrier (1, 1') comprising a DVD memory member (21) having a layer transparent for radiation and an information recording layer adjoining the layer transparent for radiation, wherein the information recording layer has a surface on which surface memory areas for digital information are arranged in accordance with DVD standard, wherein the data carrier comprises a through opening (7, 7', 7") matched to a receiving means of a standard DVD reading and/or writing device, wherein a thickness (4) of the data carrier is equal to a thickness of approximately 0.8 mm of a chip card or magnetic strip card, and wherein the DVD memory member (21) has a thickness (18) of between 0.5 mm and 0.75 mm.

2. The data carrier according to claim 1, having a length (2) and a width (3) of a standard chip card data carrier.

3. The data carrier according to claim 1, comprising a support member (16) having a circular ring-shaped recess (17) configured to receive the DVD memory member (21) such that the data carrier (1,1') has substantially planar surfaces when the DVD memory member (21) is received in the recess (17).

4. The data carrier according to claim 3, wherein a depth of the recess (17) of the support member (16) corresponds to the thickness (18) of the DVD memory member (21).

5. The data carrier according to claim 1, wherein the DVD memory member (21) has an outer diameter which corresponds substantially to a width (3) of a standard chip card data carrier.

6. The data carrier according to claim 3, having a chip element (5) configured to be read by contact surfaces and to be inserted into the support member (16) such that the data carrier (1, 1') has a substantially planar surface when the chip element (5) is inserted into the support member (16).

7. The data carrier according to claim 1, wherein the through opening (7) is arranged eccentrically in the data carrier (1).

8. An adapter (8, 8') for a reading and/or writing device for digital data, the adapter (8, 8') comprising:
a base member (9, 10) having a substantially rectangular recess (12, 12') with inner dimensions that are slightly greater than outer dimensions of a plate-shaped data carrier (1, 1') according to claim 1 to be received therein;
the base member (9, 10) having a central opening (11) which is coaxial to a through opening (7, 7', 7") of the data carrier (1, 1') to be received therein, wherein a unit to be formed of the adapter (8, 8') and the data carrier (1, 1') is configured to rotate without balance error about a central axis (15) extending through the through opening (7, 7') and the central opening (11);
wherein a sum of a thickness of the data carrier (1, 1') and a thickness of the base member (9, 10) measured at the recess (12, 12') corresponds to a thickness of a standard DVD data carrier.

9. The adapter according to claim 8, wherein the plate-shaped data carrier (1, 1') to be inserted into the recess (12, 12') is a standard chip card or magnetic strip card.

10. The adapter according to claim 8, having a basic shape of a standard DVD data carrier.

11. The adapter according to claim 8, wherein the base member (9, 10) comprises a first circular disk (9) and a second circular disk (10), wherein the first circular disk (9) has a thickness of substantially 0.8 mm and the second circular disk has a thickness of substantially 0.4 mm.

12. The adapter according to claim 11, wherein the first circular disk (9) has a rectangular cutout forming together with an end face of the second circular disk (10) the recess (12,12') of the adapter.

13. The adapter according to claim 8, wherein a surface formed by a transparent layer of the data carrier (1, 1') is flush with an outer surface (14) of the first circular disk (9).

14. The adapter according to claim 13, integrally formed by injection molding.

15. The adapter according to claim 8, wherein the recess (12) is arranged eccentrically relative to the central opening (11).

16. The adapter according to claim 15, wherein the through opening (7) of the data carrier (1, 1') through which the central axis (15) extends is eccentrically arranged in the data carrier (1, 1').

17. The adapter according to claim 15, wherein the recess (12,12') is arranged within the continuously circular outer periphery of the adapter.

18. A plate-shaped optical data carrier unit comprising:
   a card member (1, 1') of a substantially rectangular shape, the card member comprising a memory member (21) having a layer transparent for radiation and an information recording layer adjoining the layer transparent for radiation, wherein the information recording layer has a surface on which surface memory areas for digital information are arranged in accordance with DVD standard, wherein the card member comprises a through opening (7,7',7") matched to a receiving means of a reading and/or writing device, wherein a thickness (4) of the card member is equal to a thickness of approximately 0.8 mm of a chip card or magnetic strip card, and wherein the memory member (21) has a thickness (18) of between 0.5 mm and 0.75 mm.

19. The optical data carrier unit according to claim 18, further comprising:
   an adapter (8, 8') for a reading and/or writing device for digital data, the adapter (8,8') comprising a base member (9, 10) having a substantially rectangular recess (12, 12') with inner dimensions that are slightly greater than outer dimensions of the card member, wherein the card member is exchangeably received in the rectangular recess;
   wherein the base member (9, 10) has a central opening (11) which is coaxial to the through opening (7, 7', 7") of the card member (1, 1') to be received therein;
   wherein a unit to be formed of the adapter (8, 8') and the card member (1, 1') is configured to rotate without balance error about a central axis (15) extending through the through opening (7, 7') and the central opening (11);
   wherein a sum of a thickness of the card member (1, 1') and a thickness of the base member (9, 10) measured at the recess (12, 12') corresponds to a thickness of a standard DVD data carrier.

20. The optical data carrier unit according to claim 19, wherein the reading and/or writing device is a standard DVD reading and/or writing device.

* * * * *